United States Patent

Siefert et al.

[11] Patent Number: 5,200,089
[45] Date of Patent: Apr. 6, 1993

[54] PULP AND PAPER MILL WASTEWATER COLOR REMOVAL

[75] Inventors: Kristine S. Siefert, Crete; Manian Ramesh, Naperville; Martha R. Finck, Countryside; Chandrashekar S. Shetty, Lisle, all of Ill.

[73] Assignee: Nalco Chemical Company, Naperville, Ill.

[21] Appl. No.: 744,172

[22] Filed: Aug. 12, 1991

[51] Int. Cl.⁵ .............................. C02F 1/56
[52] U.S. Cl. .................. 210/725; 210/728; 210/736; 210/917; 210/928
[58] Field of Search ............... 210/725, 727, 728, 735, 210/736, 917, 928

[56] References Cited

U.S. PATENT DOCUMENTS 3,894,946  7/1975  Panzer et al. .................. 210/928
3,953,330  4/1976  Tonkyn et al. ................. 210/736
4,155,847  5/1979  Tanaka et al. ................. 210/729
4,450,092  5/1984  Huang ........................... 210/728
4,668,403  5/1987  Walterick et al. ............. 210/736
4,800,039  1/1989  Hassick et al. ................ 210/728
4,851,128  7/1989  Rose ............................ 210/694

FOREIGN PATENT DOCUMENTS 50-146160  11/1975  Japan ............................ 210/928

Primary Examiner—Peter Hruskoci
Attorney, Agent, or Firm—Robert A. Miller; Joseph B. Barrett

[57] ABSTRACT

The invention provides a method for decolorizing an effluent stream from a pulp mill plant comprising the step of adding an effective amount of a decolorizing composition including a ferrous sulfate and a water-soluble cationic amine polymer.

4 Claims, 1 Drawing Sheet

PULP AND PAPER MILL WASTEWATER COLOR REMOVAL

BACKGROUND OF THE INVENTION

1. Field of the Invention

This invention relates to paper making processes, and more particularly, to processes for reducing the total color in effluent streams originating in the production of pulp and paper materials.

2. Description of the Prior Art

Large amounts of water are used in the various stages of the papermaking process. The papermaking process includes several steps, i.e., bark removal, pulping, bleaching, etc. Each of these steps uses a great deal of water. While significant improvements have been made in conserving and reusing water in the papermaking process, it is still necessary to discharge a certain amount of waste water from the system.

The effluent water stream from a pulp mill is contaminated with lignins, lignin degradation products and humic acids. These contaminants make the effluent stream dark colored and are often referred to as color bodies. Since pulp mill plants produce large quantities of this densely-colored effluent, the discharge of this effluent into adjacent streams and bodies of water can cause an objectionable discoloration of the water.

FIG. 1 is a schematic representation of a typical pulp mill plant's waste water treatment system. The effluent stream 1 leaving the pulp plant empties into a settling basin 3. The pH of the effluent entering basin 3 is generally from pH 9 to 10. Various processes have been proposed for the decolorization of the effluent at this stage. Conventional non-biological effluent treatment processes, such as the precipitation of the suspended solids with lime, polyelectrolyte polymers or inorganic metallic salts are effective in removing some color from such effluent. However, polyelectrolyte polymers are prohibitively expensive for treating the quantities of effluents generated by commercial-size pulp and paper plants. Furthermore, inorganic metallic salts produce a great deal of sludge when used at appropriate levels to treat this quantity of water. This sludge must be removed and disposed of at a cost which renders these metallic salts impractical. Furthermore, several inorganic metallic salts will not precipitate suspended solids at a pH of 9 to 10. Therefore, an additional step of lowering the pH of the effluent would be required.

Once the suspended solids have been precipitated in basin 3, the effluent stream moves through channel 5 into bio-degradation basins 7 and 9. The pH of the stream entering the bio-degradation basins 7 and 9 must be between pH 7 and 8 in order to prevent damage to the micro-organisma in the basins. Generally, the pH of the stream entering basins 7 and 9 is lowered to pH 7-8 by injecting carbon dioxide gas into the stream as it travels through channel 5. The cost of the injected carbon dioxide can be as high as several hundred thousand dollars annually in a large pulp mill plant. On the other hand, if, however, the pH of the effluent in the basin 3 has been lowered below pH 7 so that metallic salts, such as ferric iron salts, can be used as the precipitating agent, the pH would have to be raised back up to 7 or 8. Moreover, if inorganic metallic salts, such as ferric iron salts, are used to precipitate the suspended solids in the basin 3, these metallic salts must be removed prior to the effluent entering the bio-degradation basins 7 and 9, since high concentrations of metallic ions are toxic to the micro-organisms in the basins 7 and 9. The effluent thereafter leaves the bio-degradation basins 7-9 via channel 11 into setting pools 13 and 15, and is subsequently discharged into a lake, stream or municipal sewer.

In view of the deficiencies of the prior processes for decolorization of pulp mill effuents, it is an object of this invention to provide an efficient and practical process for decolorization of effluents.

It is a further object of the invention to provide an efficient process for decolorization of pulp mill effluents in which the discharge stream is of adequate quality to be conducted into natural bodies of water without further treatment.

SUMMARY OF THE INVENTION

The invention obtains the above objects and other advantages by providing a method for decolorizing an effluent stream from a pulp mill plant. The method comprising the step of adding an effective amount of a decolorizing composition including a ferrous sulfate and a water-soluble cationic amine polymer in a molar ratio of from 30 to 1 to 1 to 1. In one preferred embodiment of the invention, the water-soluble cationic amine polymer is formed by the reaction of epichlorohydrin with dimethylamine. In another preferred embodiment of the invention, the water-soluble cationic amine polymer is a polydially dimethyl ammonium chloride polymer having a molecular weight of from about 10,000 to 150,000. According to a further preferred embodiment, the water-soluble cationic polymer is a copolymer of polydially dimethyl ammonium chloride and acrylamide.

A further aspect of the invention provides a method for decolorizing an effluent stream from a pulp mill plant. The method comprising the steps of adding an effective amount of a water-soluble cationic amine polymer to the effluent stream, and also adding an effective amount of ferrous sulfate to the same effluent stream. The molar ratio of the ferrous sulfate and the water-soluble cationic amine polymer added to the effluent stream being from 30 to 1 to 1 to 1. The effective amount of the water-soluble cationic amine polymer and the effective amount of the ferrous sulfate synergistically combine to reduce the True Color of the effluent stream by at least 90%.

A still further aspect of the invention also provides a method for decolorizing an effluent stream from a pulp mill plant. The method comprising the step of adding, in combination, a ferrous sulfate and a water-soluble cationic amine polymer to the effluent stream such that the concentration of the added ferrous ion in the effluent stream is from 60 to 200 ppm and the concentration of the added active water-soluble cationic amine polymer in the effluent stream is from 20 to 80 ppm, wherein the Total Color of the effluent stream is reduced by at least 90%.

DESCRIPTION OF THE PREFERRED EMBODIMENTS

Figure 1:
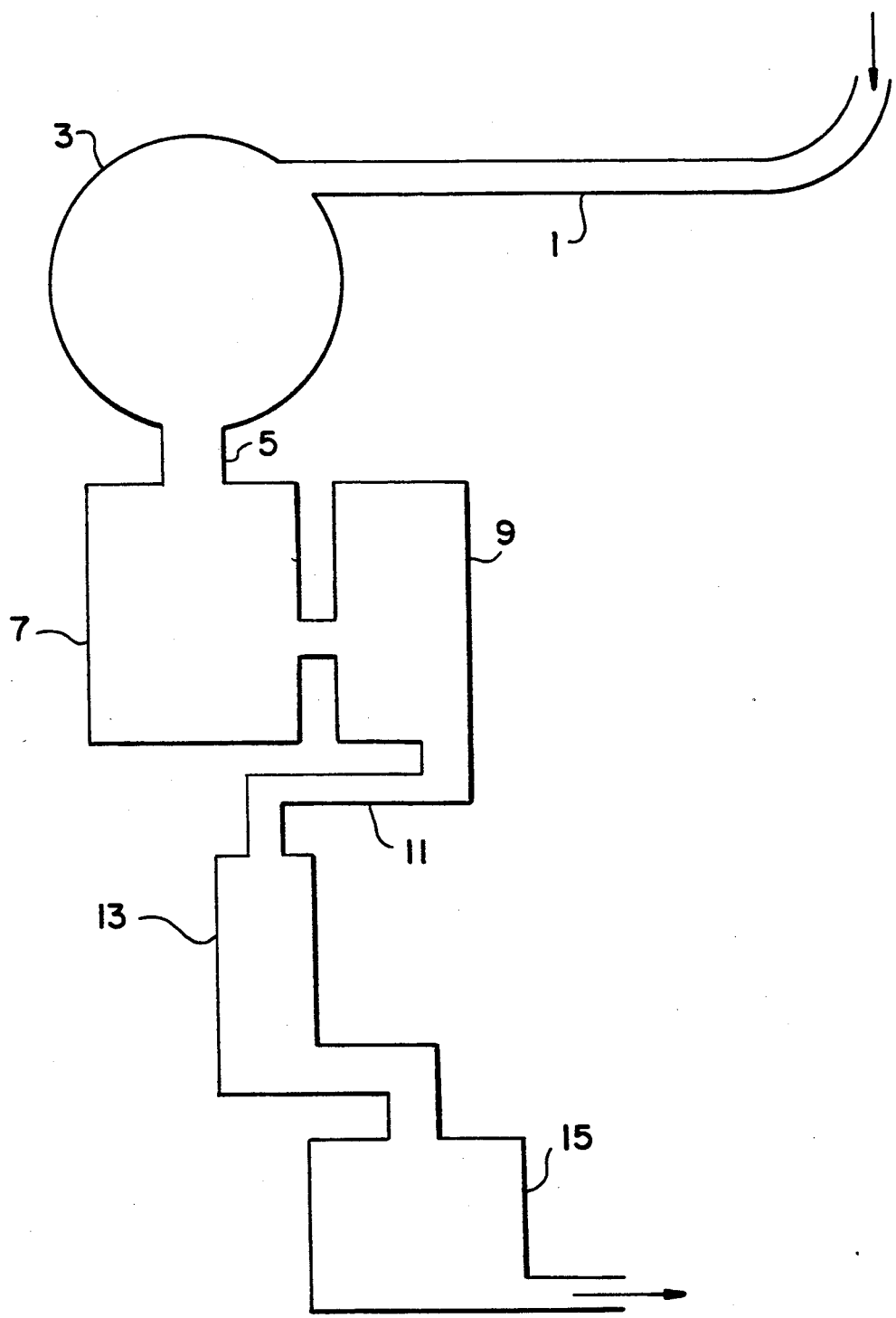
FIG. 1 is schematic of a representative effluent water treatment system at a pulp mill.

In the conventional pulp paper manufacturing process, the effluent stream from the process contains a large quantity of color bodies. These color bodies are generally lignins, lignin degradation products or humic acids. These color bodies impart a dark color to the effluent stream. This color is expressed in Pt-Co units and is referred to as its True Color. The method for measuring True Color was standardized by the National Council of Air and Stream Improvement (NCASI) of the Pulp and Paper Industry. This method for determining True Color is used herein to demonstrate the effectiveness of the present invention. The method is described fully in *An Investigation of Improved Procedure for Measurement of Mill Effluent and Receiving Water Color*, NCASI Technical Bulletin No. 2538, December, 1971, incorporated herein by reference. Generally, the NCASI method for measuring True Color is as follows. A sample of the effluent stream is obtained and the pH of the stream is adjusted to pH 7.6. The sample is thereafter filtered through a 0.8 micron membrane to remove flocculated or suspended solids. The absorbance of this sample is then determined at 465 nm in a spectrophotometer. This absorption is related to a calibrated curve which is expressed in Pt-Co units. The True Color of this sample is read from this absorbance curve as Pt-Co units.

The color of the effluent stream can also be expressed as "apparent color". Apparent color is generally determined without treating the sample, as required in True Color evaluation. For purposes of the invention, apparent color is a function of the turbidity of the effluent stream at an unadjusted pH. The turbidity is typically measured in FTUs (Formazin Turbidity Units) by the Hach absorptometric method. This method measures the extinction of light at 450 nanometers in a spectrophotometer.

A typical process for treating pulp paper mill effluent streams is illustrated in FIG. 1. As discussed above, before the effluent stream enters the biodegradation basins 7 and 9, the pH of the effluent must be adjusted to between pH 7 to 8. This is often accomplished by injecting costly carbon dioxide into the effluent stream in channel 5. One significant advantage of the present invention is that the compositions of the present invention substantially reduce the apparent and True Color of the effluent stream, while simultaneously reducing the pH of the effluent stream from the pH 9 to 10 to a pH of about pH 7 to 8 required for the bio-degradation basins. This advantage of the invention obviates the need to inject costly carbon dioxide into channel 5 to reduce the pH.

The present invention provides a method for decolorizing the effluent stream by adding a decolorizing composition including an effective amount of a ferrous sulfate and a water-soluble cationic amine polymer. These ingredients can be premixed as a prepackaged composition or may be added individually to the effluent stream. However, it is an important aspect of the present invention that these ingredients be present in the effluent stream simultaneously so that they may react synergistically to reduce the total and apparent color of the effluent stream.

According to one embodiment of the invention, the effective amount of the ferrous sulfate and the effective amount of the water-soluble cationic amine polymer are prepared as a prepackaged preparation including the ferrous sulfate and the water-soluble cationic amine polymer in a molar ratio of from 30 to 1 to 1 to 1. More preferably, the molar ratio is from about 20 to 1 to about 5 to 1. For purposes of the present invention, these molar ratios are meant to represent the molar ratio of the $Fe^{++}$ to the active water-soluble cationic amine polymer.

According to another embodiment of the invention, the ferrous sulfate and water-soluble cationic amine polymer are added to the effluent stream as separate preparations. According to this embodiment of the invention, these ingredients are added so that they simultaneously react with the color bodies included in the effluent stream. It is preferred that the added ferrous sulfate in the effluent stream is included in a concentration of 60 to 200 ppm $Fe^{++}$ and the concentration of the added water-soluble cationic amine polymer in the effluent stream is from 20 to 80 ppm active polymer.

According to tests of the present invention, the compositions of the present invention surprisingly and unexpectedly reduced the True Color of the effluent stream by as much as 95% when added in the above molar ratios or concentrations. This is a significant improvement over prior art compositions for reducing total color in effluent streams.

The ferrous sulfate ingredient is preferably added as ferrous sulfate heptahydrate. Ferrous sulfate heptahydrate provides 20% $Fe^{++}$ and is provided as a dry powder, commercial grade by the Van Waters & Rogers Chemical Company. The example herein described utilized ferrous sulfate in this form. Ferrous sulfate preparations also considered useful for the present invention are ferrous sulfate solutions which provide 5% $Fe^{++}$ and ferrous sulfate heptahydrate moist cake which provides 17.5% $Fe^{++}$.

The inclusion of ferrous sulfate in the compositions of the present invention provides several advantages. The first and most dramatic advantage is that the ferrous sulfate reacts synergistically with the water-soluble cationic amine polymer to reduce the True and apparent color of the effluent stream to surprisingly low levels. This dramatic and unexpected effect is documented in the example described herein. Ferrous sulfate also provides the further advantage of maintaining its decolorizing activity at a pH of from 9 to 10. Other metallic salts, such as ferric iron salts, do not precipitate color bodies at this pH and would not be effective or active in the effluent water treatment system described in FIG. 1. In order for a ferric iron salt to be active, the pH of the effluent stream would have to be lowered to about pH 4-5. Furthermore, a discussed above, the pH would then have to be subsequently raised in order for the effluent to enter the bio-degradation basins.

The water-soluble cationic amine polymers of the invention are referred to as coagulants or flocculants. One preferred class of the water-soluble cationic amine polymers are the polydiallyl dimethyl ammonium chloride polymers which for the purpose of this invention preferably have a molecular weight of at least 3,000 up to a molecular weight not exceeding 1,000,000 weight average. A more preferred molecular weight range being 10,000 to 150,000 weight average. These molecular weights are weight average molecular weights. The polydiallyl dimethyl ammonium chloride polymers and their method of preparation are described in U.S. Pat. No. 3,288,770, the disclosure of which is incorporated herein by reference. According to another preferred embodiment of the invention, the polydiallyl dimethyl ammonium chloride polymer is copolymerized with acrylamide. Copolymers of this type and their method of preparation are described in U.S. Pat. No. 3,920,599, the disclosure of which is incorporated herein by reference. Preferably, these copolymers have a molecular weight of at least 3,000 up to a molecular weight not exceeding 1,000,000 weight average. A more preferred molecular weight range being 10,000 to 150,000 weight average. These molecular weights are weight average molecular weights.

Another preferred class of water-soluble cationic amine polymers are those polymers formed by the reaction of halohydrins, such as epichlorohydrin, with lower alkyl diamines. Products of this type are described in U.S. Pat. No. 3,738,945, the disclosure of which is incorporated herein by reference. The most preferred group of polymers described by this patent are formed by the reaction of epichlorohydrin with dimethylamine (Epi-DMA).

According to one embodiment of the invention, the color reducing compositions of the invention are preferably added to the paper mill waste water containing the color bodies prior to its entering channel 5. The dosage is based upon total suspended solids present in the waste water and the amount of ferrous sulfate used. Therefore, the dosage of the active water-soluble cationic amine polymer may be as little as 1-2 ppm up to 200 ppm. The preferred dosage being about 50 ppm. In the example below, dosage was determined by routine experimentation using Epi/DMA.

The following examples are presented to describe preferred embodiments and utilities of the invention and are not meant to limit the invention unless otherwise stated in the claims appended hereto.

EXAMPLE 1

Each wastewater sample was characterized by some or all of the following analyses: pH—measured with a combination glass/reference electrode; True Color—measured by the NCASI method using a Hach DR2000 spectrophotometer; Specific Conductance or Conductivity-measured with a conductivity cell/meter (expressed in microohms/cm); Total Suspended Solids (TSS)—measured the total residue retained on a standard glass fiber filter disk after filtration of a well mixed sample of wastewater according to the method described in *Standard Methods for the Examination of Water and Wastewater*, Method 208D, APHA-AWWA-WPCF, 14th Ed., 1975, p94; Total Organic Carbon-measured after pretreatment of wastewater sample to remove carbonates and carbon dioxide followed by oxidation of organics to carbon dioxide and detection in appropriate instrumentation; Total Soluble Iron-measured by the Hach Chemical TPTZ Method; Turbidity (Apparent Color)-measured in FTUs (Formazin Turbidity Units) using the Hach Absorptometric Method at a light extinction wave length of 450 nm. The Epi-DMA polymer solution used was obtained from Nalco Chemical Company, Naperville, Ill., the polymer solution included 50 wt % linear, active polymer having an Intrinsic Viscosity of from 0.08–0.12 dL/g. Ferrous Sulfate Heptahydrate, $FeSO_4.7H_2O$, 20% Fe, dry powder, commercial grade was obtained from Van Waters and Rogers Chemical Company. Hydrated Lime, $Ca(OH)_2$ was obtained from Nalco Chemical Company.

The trials 1–30 listed in Table 1 below were all conducted as follows. A 1200 ml sample of wastewater from a pulp paper mill effluent stream was placed in a 1500 ml beaker. A two inch Teflon-coated stirring bar was placed in the beaker. The sample was stirred by a magnetic stir plate. The sample solution pH was continuously monitored. The dry ferrous sulfate was weighed on a tared weigh boat. The ferrous sulfate was poured into the vortex of the mixing wastewater. Dissolution was rapid. A typical pH depression with 600 ppm of $FeSO_4.7H_2O$ is 1.5-2.0 pH units. An appropriate amount of hydrated lime as a 2% slurry was added to the wastewater to adjust the pH to 9–10. Typical lime usage for wastewater with pH of 10.2 treated with 600 ppm of $FeSO_4.7H_2O$ is 120 ppm as $Ca(OH)_2$. The Epi-DMA was then added to the wastewater. Stirrer speed was increased for 15 seconds of fast mixing and then lowered for 5 minutes of slow mixing. At the end of the slow mix time, the stirrer speed was raised so that the floc was well mixed. 60 ml of liquid was withdrawn with a large syringe; this sample was used for total suspended solids measurement. Another 140 ml was withdrawn and transferred to a small beaker. The pH, turbidity, conductivity, and True Color of supernatant was measured after 10 minutes of settling. The remaining 1000 ml of treated wastewater was transferred to an Imhoff cone for settling studies. This cone was left for 24 hours settling time. The volume of sludge in the Imhoff cone was thereafter recorded. 60 ml of supernatant was withdrawn for subsequent total suspended solids testing. Another 50 ml of supernatant was withdrawn and pH, turbidity, True Color, conductivity, soluble iron, total organic contents was measured. Supernatant pH typically dropped 0.5 units, turbidity dropped considerably, but True Color readings agreed with sample taken on the previous day.

TABLE 1

| | RAW WASTE WATER CHARACTERIZATION | | | BENCH TEST DATA FOR EFFLUENT WATER | | | | |
|---|---|---|---|---|---|---|---|---|
| | | | | TREATMENT | | SUPERNATANT PARAMETERS | | |
| | | Color Base | COND. Base | CONCENTRATION (PPM) | | Color; Final | Turb. Final | Cond. Final |
| Trials | PH | Pt. Co. Units | mS | FeSO4.7H2O | EpIDMA | Pt. Co. Units | FTU. Turb. | mS |
| 1 | 9.6 | 961 | 1.93 | 0 | 60 | 399 | | 1.92 |
| 2 | | | | 600 | 50 | 97 | | 2.23 |
| 3 | 10.6 | 1606 | 2.45 | 0 | 60 | 598 | | |
| 4 | | | | 800 | 50 | 96 | 60 | 2.61 |
| 5 | 8.19 | 1120 | 1.98 | 0 | 60 | 431 | 181 | 1.98 |
| 6 | | | | 600 | 50 | 84 | 41 | 2.07 |
| 7 | 10.15 | 1008 | 2.27 | 0 | 50 | 475 | 203 | 2.27 |
| 8 | | | | 500 | 50 | 123 | 70 | 2.44 |
| 9 | 9.87 | 985 | 2.08 | 0 | 50 | 459 | 199 | 2.08 |
| 10 | | | | 700 | 50 | 87 | 46 | 2.28 |
| 11 | 10.13 | 1053 | 1.95 | 0 | 50 | 429 | 199 | 1.95 |
| 12 | | | | 700 | 50 | 79 | 42 | 2.06 |
| 13 | 8.7 | 1085 | 1.83 | 0 | 50 | 481 | | 1.83 |
| 14 | | | | 600 | 50 | 96 | 140 | 2.01 |
| 15 | 9.59 | 1226 | 1.94 | 0 | 50 | 370 | 182 | 1.94 |
| 16 | | | | 600 | 50 | 85 | 62 | 2.04 |

TABLE 1-continued

| | RAW WASTE WATER CHARACTERIZATION | | | BENCH TEST DATA FOR EFFLUENT WATER | | | | |
|---|---|---|---|---|---|---|---|---|
| | | | | TREATMENT | | SUPERNATANT PARAMETERS | | |
| | | Color Base | COND. Base | CONCENTRATION (PPM) | | Color; Final | Turb. Final | Cond. Final |
| Trials | PH | Pt. Co. Units | mS | FeSO4.7H2O | EpIDMA | Pt. Co. Units | FTU. Turb. | mS |
| 17 | 9.07 | 942 | 2.46 | 0 | 50 | 392 | 187 | 2.46 |
| 18 | | | | 700 | 50 | 82 | 141 | 2.42 |
| 19 | 10.01 | 966 | 2.26 | 0 | 50 | 342 | 188 | 2.26 |
| 20 | | | | 600 | 50 | 77 | 99 | 2.21 |
| 21 | 8.53 | 1163 | 2.02 | 0 | 50 | 431 | 179 | 2.02 |
| 22 | | | | 600 | 50 | 96 | 224 | 1.99 |
| 23 | 9.5 | 1023 | 1.85 | 0 | 50 | 434 | 221 | 1.85 |
| 24 | | | | 600 | 50 | 67 | 57 | 2 |
| 25 | 9.06 | 991 | 1.94 | 0 | 50 | 345 | 178 | 1.94 |
| 26 | | | | 600 | 50 | 73 | 133 | 2.01 |
| 27 | 9.6 | 919 | 1.84 | 0 | 50 | 238 | | 1.84 |
| 28 | | | | 600 | 50 | 80 | 59 | 2.04 |
| 29 | 10.05 | 1027 | 2.34 | 0 | 50 | 420 | 184 | 2.34 |
| 30 | | | | 700 | 50 | 85 | 62 | 2.36 |

We claim:

1. A method for decolorizing an effluent stream from a pulp mill plant, said effluent stream having a pH of from about 9 to about 10 and including color bodies, the method comprising the steps of adding an effective amount of a decolorizing composition including ferrous sulfate and a water-soluble cationic amine polymer formed by the reaction of epichlorohydrin with dimethylamine, the ferrous sulfate and polymer in a molar ratio of from 30 to 1 to 1 to 1, said decolorizing composition reacting with the color bodies to form a sludge; and removing the sludge from the effluent stream.

2. The method of claim 1 wherein the molar ratio is from 20 to 1 to 5 to 1.

3. A method for decolorizing an effluent stream from a pulp mill plant, said effluent stream having a pH of from about 9 to about 10 and including color bodies, the method comprising the steps of:
  a) adding an effective amount of a water-soluble cationic amine polymer formed by the reaction of epichlorohydrin and dimethylamine to the effluent stream;
  b) adding an effective amount of ferrous sulfate to the effluent stream, wherein the molar ratio of said ferrous sulfate added to the effluent stream is said water-soluble cationic amine polymer added to the effluent stream is from 30 to 1 to 1 to 1, and the effective amount of said water-soluble cationic amine polymer and the effective amount of ferrous sulfate in combination react with the color bodies to from a sludge thereby reducing the true color of the effluent stream by at least 90%; and
  c) removing the sludge from the effluent stream.

4. A method for decolorizing an effluent stream from a pulp mill plant, said effluent stream having a pH of from about 9 to about 10 and including color bodies, the method comprising the steps of adding, in combination, ferrous sulfate and a water-soluble cationic amine polymer formed by the reaction of epichlorohydrin and dimethylamine to the effluent stream such that the concentration of the added ferrous sulfate in the effluent stream is from 60 to 200 ppm and the concentration of the added water-soluble cationic amine polymer in the effluent stream is from 20 to 80 ppm, the ferrous sulfate and water-soluble cationic amine polymer reacting with the color bodies to form a sludge; and removing the sludge from the effluent stream, wherein the total color of the effluent is reduced by at least 80%.

* * * * *